United States Patent
Zhang et al.

(10) Patent No.: US 12,099,029 B2
(45) Date of Patent: Sep. 24, 2024

(54) SUPERHYDROPHILIC THICK-FILM pH SENSOR BASED ON CHEMICAL ETCHING, AND PREPARATION METHOD THEREOF

(71) Applicant: JIANGSU UNIVERSITY, Zhenjiang (CN)

(72) Inventors: Xiliang Zhang, Zhenjiang (CN); Cheng Chen, Zhenjiang (CN); Tianyu Mao, Zhenjiang (CN); Xiaoqing Su, Zhenjiang (CN); Yalei Zhang, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 18/575,308

(22) PCT Filed: Sep. 26, 2021

(86) PCT No.: PCT/CN2021/120525
§ 371 (c)(1),
(2) Date: Dec. 29, 2023

(87) PCT Pub. No.: WO2023/272978
PCT Pub. Date: Jan. 5, 2023

(65) Prior Publication Data
US 2024/0264108 A1    Aug. 8, 2024

(30) Foreign Application Priority Data

Jun. 29, 2021   (CN) .......................... 202110730703.X (51) Int. Cl.
*G01N 27/30*   (2006.01)
*B01J 16/00*   (2006.01)
*C23F 1/38*    (2006.01)

(52) U.S. Cl.
CPC ............ *G01N 27/302* (2013.01); *B01J 16/00* (2013.01); *C23F 1/38* (2013.01); *G01N 27/301* (2013.01)

(58) Field of Classification Search
CPC ....................................................... B01J 16/00
See application file for complete search history.

(56) References Cited

U.S. PATENT DOCUMENTS

2003/0217919 A1*  11/2003  Yajima ................. G01N 27/401
                                                          204/435
2014/0332411 A1*  11/2014  Lawrence ............ G01N 27/302
                                                          204/406
(Continued)

FOREIGN PATENT DOCUMENTS

CN         104007158 A        8/2014
CN         105842313 A        8/2016
(Continued)

OTHER PUBLICATIONS

Rongrong Zhao, et al., A pH sensor based on the TiO2 nanotube array modified Ti electrode, Electrochimica Acta, 2010, pp. 5647-5651, vol. 55.
(Continued)

*Primary Examiner* — Binh X Tran
(74) *Attorney, Agent, or Firm* — Bayramoglu Law Offices LLC (57) ABSTRACT

A superhydrophilic thick-film pH sensor based on chemical etching, and a preparation method thereof are provided. The superhydrophilic thick-film pH sensor includes: a substrate, and a working electrode and a reference electrode that cover surfaces of the substrate. The working electrode includes a titanium sheet attached to one side of the substrate; a front part of an outer surface of the titanium sheet is covered with a titanium dioxide sensitive layer; an electrically-conductive layer is attached to the other side of the substrate; the
(Continued)

reference electrode is located on the electrically-conductive layer, and a surface of the reference electrode is coated with a naphthol layer; and an insulating gel wraps the substrate to expose only the working electrode and the reference electrode. The working electrode is obtained by soaking the titanium sheet in an 80° C. NaOH solution, and is integrated with the reference electrode to produce the thick-film pH sensor.

8 Claims, 13 Drawing Sheets

(56) References Cited

U.S. PATENT DOCUMENTS

| | | | | |
|---|---|---|---|---|
| 2018/0321174 | A1* | 11/2018 | Zhang | G01N 27/302 |
| 2019/0079042 | A1* | 3/2019 | Xu | H10K 85/221 |
| 2020/0264131 | A1* | 8/2020 | Gahlings | G01N 33/18 |
| 2020/0284755 | A1* | 9/2020 | Nicholas | G01N 27/4167 |

FOREIGN PATENT DOCUMENTS

| | | |
|---|---|---|
| CN | 106018516 A | 10/2016 |
| CN | 113406167 A | 9/2021 |

OTHER PUBLICATIONS

Chen Jing-Yun, et al., A Study on Preparation of TiO2 Thin Films by Alkali Treatment of Ti Foils, Journal of Chemical Engineering of Chinese Universities, 2013, pp. 1051-1057, vol. 27 No. 6.

Q. Ye, P.Y. Liu, et al., Hydrophilic properties of nano-TiO2 thin films deposited by RF magnetron sputtering, Vacuum, 2007, pp. 627-631, vol. 81.

Shu-Ying Yang, et al., Investigation on the sensitivity of TiO2:Ru pH sensor by Taguchi design of experiment, Solid-State Electronics, 2012, pp. 82-86, vol. 77.

K. Kinoshita, et al., Electrochemical Measurements on Pt, Ir, and Ti Oxides as pH Probes, Journal of The Electrochemical Society, 1984, pp. 1089-1094, vol. 131 No. 5.

Libu Manjakkal, et al., Metal oxides based electrochemical pH sensors: Current progress and future perspectives, Progress in Materials Science, 100635, 2020, pp. 1-31, vol. 109.

* cited by examiner

SUPERHYDROPHILIC THICK-FILM pH SENSOR BASED ON CHEMICAL ETCHING, AND PREPARATION METHOD THEREOF

CROSS REFERENCE TO THE RELATED APPLICATIONS

This application is the national phase entry of International Application No. PCT/CN2021/120525, filed on Sep. 26, 2021, which is based upon and claims priority to Chinese Patent Application No. 202110730703.X, filed on Jun. 29, 2021, the entire contents of which are incorporated herein by reference.

TECHNICAL FIELD

The present disclosure relates to the technical field of sensors, and specifically to a superhydrophilic thick-film pH sensor based on chemical etching, and a preparation method thereof. The superhydrophilic thick-film pH sensor can be mainly used for on-line detection of a pH of a heterogeneous system such as a cultivation soil and a cultivation substrate in agricultural production.

BACKGROUND

"Phase" is a basic concept of thermodynamics, and refers to a part in a system that has uniform physical and chemical properties and an obvious boundary and can be separated by a mechanical method, such as a solid phase, a liquid phase, or a gas phase. A heterogeneous system refers to a system in which there are two or more phases in a specified space and there is an obvious interface among the two or more phases. For example, when $Ca(OH)_2$ is precipitated as a floccus in water, water and $Ca(OH)_2$ together constitute a heterogeneous system. In life, some heterogeneous systems have very complicated compositions, such as soils, agricultural cultivation substrates, solid/liquid mixed wastes, and sand-seawater intersectional regions along shorelines. In these systems, a solid phase, a liquid phase, and a gas phase are irregularly staggered and have very complicated internal structures, and thus it is usually very difficult to determine physical and chemical parameters (such as pH and electrical conductivity) in these systems. The determination of relevant parameters by laboratory methods can lead to results with high accuracy, but is time-consuming, laborious, and inefficient. The direct on-line detection of relevant parameters by sensors is fast and efficient, but leads to results with low accuracy and poor practicability.

In Chinese Patent CN201610301183.X "Micro-nano Textured Graphene-based Bionic pH Sensor and Preparation Method Thereof", Zhang Xiliang, Xu Kun, et al. disclose a pH sensor for a soil and a cultivation substrate. The pH sensor can enrich moisture in a surrounding environment through a superhydrophilic surface and spread the moisture on the superhydrophilic surface, such that a contact environment of the pH sensor is transformed from a complicated heterogeneous system to a simple liquid-phase system and a surface of an electrode has a microenvironment suitable for detection, which allows the fast and accurate detection of a pH in the heterogeneous system. The superhydrophilicity of a surface of an electrode in this patent is provided by manufacturing micro-scale or nano-scale pits or grooves on a sensitive material layer of the electrode through a femtosecond laser, but it is expensive and requires thousands of yuan for processing of a single electrode, which limits the application and promotion of the pH sensor in agricultural production.

Currently, in addition to femtosecond laser processing, there are many methods to prepare a superhydrophilic surface, including a chemical etching method, a sol-gel method, a layer-by-layer (LbL) self-assembly method, an anodic oxidation method, an ultraviolet (UV) irradiation method, or the like, which can significantly reduce a preparation cost of a superhydrophilic surface. For example, it is pointed out in the "*Study on Preparation of $TiO_2$ Thin Film by Treating Ti Sheet with Strong Alkali*" that the Ti sheet can be soaked in hot NaOH to form a $TiO_2$ surface with a nanoflower microtexture. Some metal oxides can also exhibit superhydrophilicity under specific conditions. For example, as described in "*Hydrophilic properties of nano-$TiO_2$ thin films deposited by RF magnetron sputtering*", when an annealing temperature is 400° C., a $TiO_2$ thin-film prepared through magnetron sputtering will be converted into an anatase crystal with superhydrophilicity.

However, whether a material investigated has a hydrogen ion concentration response characteristic is not mentioned in the above references. This is because electrochemical properties of a metal oxide are closely related to a crystal structure, a surface atomic state, and an electronic state in an atom, with very complicated laws. For example, in "*A pH sensor based on the $TiO_2$ nanotube array modified Ti electrode*", a $TiO_2$ surface is also prepared by an anodic oxidation method, where $TiO_2$ nanotubes produced can lead to excellent pH responsiveness and excellent hydrophilicity, and the hydrophilicity can be further enhanced after UV irradiation, which will further improve the pH detection sensitivity of the pH sensor. However, in *Electrochemical measurements on Pt, Ir, and Ti oxides as pH probes*, a $TiO_2$ electrode prepared by an anodic oxidation method has almost no pH response. In addition, in *Investigation on the sensitivity of $TiO_2$:Ru pH sensor by Taguchi design of experiment*, a $TiO_2$ layer prepared through magnetron sputtering has a sensitivity merely of about 30 mV/pH, which is far from the theoretical value of 59.6 mV/pH. As a result, scholars believe that a final crystal type and surface stacking morphology of $TiO_2$ will affect an ability of an oxygen atom in a Ti—O—Ti bond on a surface to trap electrons, thereby affecting the hydrogen ion concentration responsiveness. Generally, anatase and amorphous $TiO_2$ exhibits hydrogen ion concentration responsiveness, but performance parameters such as response sensitivity and response time are affected by a preparation process of the anatase and amorphous $TiO_2$, and specific influence laws and mechanisms are not yet definitive and can only be determined by tests.

A thick-film sensor is significantly different from a thin-film sensor in that a thickness of a sensitive layer of an electrode is significantly increased to generally 100 nm to a few microns, and the sensitive layer is usually prepared by a chemical etching method or a sol-gel method. In "*Metal oxides based electrochemical pH sensors: Current progress and future perspectives*", it is summarized that thick-film sensors have advantages including high reliability and durability, low drift and hysteresis, long service life, and low preparation cost over thin-film sensors, but thick-film sensors have a long response time and are difficult to be directly fabricated in integrated circuits. Agricultural sensors often have high requirements for reliability, environmental adaptability, and cost control, and thus thick-film sensors are more suitable for agricultural applications than thin-film sensors.

SUMMARY

Based on the above-mentioned technical problems and related research conclusions, the present disclosure provides a superhydrophilic thick-film pH sensor based on chemical etching and a preparation method thereof in view of the problem that the current superhydrophilic pH sensors need to be prepared by a complicated process with a high production cost. In the present disclosure, through a chemical etching reaction of sodium hydroxide on a titanium surface, a titanium dioxide sensitive layer with superhydrophilicity is prepared as a pH working electrode, and integrated with a silver/silver chloride reference electrode fabricated on a substrate to produce the superhydrophilic thick-film pH sensor, which reduces a manufacturing cost of the superhydrophilic thick-film pH sensor and simplifies a production process of the superhydrophilic thick-film pH sensor. The superhydrophilic thick-film pH sensor allows the rapid and accurate on-line real-time detection of a hydrogen ion concentration in a heterogeneous system with a low cost.

The present disclosure adopts the following technical solutions. A superhydrophilic thick-film pH sensor based on chemical etching is provided, including a substrate, a working electrode, and a reference electrode, where the working electrode includes a titanium sheet attached to one side of the substrate; a front part of an outer surface of the titanium sheet is covered with a titanium dioxide sensitive layer, and a tail of the titanium sheet is connected to a first wire; an electrically-conductive layer is attached to an other side of the substrate; a tail of the electrically-conductive layer is connected to a second wire; the reference electrode is located on the electrically-conductive layer, and a surface of the reference electrode is coated with a naphthol layer; an insulating layer wraps the substrate to expose only the working electrode and the reference electrode, such that a part of the titanium dioxide sensitive layer and a part of the naphthol layer are in direct contact with an outside environment; and the first wire and the second wire are led out through the insulating layer.

In the above solution, the substrate is a glass sheet, and a material of the electrically-conductive layer is indium tin oxide (ITO); the reference electrode includes a silver layer, a silver chloride layer, and the naphthol layer; and the silver layer is arranged on the electrically-conductive layer, the silver chloride layer covers the silver layer, and the naphthol layer covers the silver chloride layer.

In the above solution, the substrate is an alumina ceramic sheet, and a material of the electrically-conductive layer is silver; the reference electrode includes a silver chloride layer and the naphthol layer; and the silver chloride layer covers a front part of the electrically-conductive layer, and the naphthol layer covers the silver chloride layer.

A preparation method of the superhydrophilic thick-film pH sensor based on chemical etching described above is provided, including the following steps:

inserting the titanium sheet into a sodium hydroxide solution to allow a reaction to produce the titanium sheet with the titanium dioxide sensitive layer at a single side;

covering the other side of the substrate with the electrically-conductive layer, and fabricating the reference electrode on a front region of the electrically-conductive layer;

dropping naphthol on the surface of the reference electrode and air drying as a cycle; and repeating the cycle three times to obtain the naphthol layer; and bonding the titanium sheet to the one side of the substrate; connecting the first wire and the second wire to the tail of the titanium sheet and the tail of the electrically-conductive layer, respectively; coating the insulating layer on a periphery of the substrate to expose only the working electrode and the reference electrode, such that the part of the titanium dioxide sensitive layer and the part of the naphthol layer are in direct contact with the outside environment; and leading the first wire and the second wire out through the insulating layer.

In the above solution, the inserting the titanium sheet into the sodium hydroxide solution to allow the reaction to produce the titanium sheet with the titanium dioxide sensitive layer at the single side specifically includes: covering a side of the clean titanium sheet with a protective film, inserting the titanium sheet into the sodium hydroxide solution to allow the reaction at 80° C. for a period of time, taking the titanium sheet out, and removing the protective film from the titanium sheet to obtain the titanium sheet with the titanium dioxide sensitive layer at the single side.

In the above solution, the sodium hydroxide solution has a concentration of 0.5 mol/L to 4 mol/L, and the reaction is performed for 15 min to 180 min.

In the above solution, the substrate is the glass sheet; the electrically-conductive layer is an ITO layer; and the silver layer is deposited in a specified area of the ITO layer, then a 1 wt % sodium hypochlorite solution is dropped on a surface of the silver layer, and after turning pale-purple, the silver layer is rinsed with deionized water to obtain the silver chloride layer.

In the above solution, the substrate is the alumina ceramic sheet; and silver is deposited on a side of the substrate to obtain the electrically-conductive layer, a 1 wt % sodium hypochlorite solution is dropped on a front area of a surface of the electrically-conductive layer, and after turning pale-purple, the front area is rinsed with deionized water to obtain the silver chloride layer.

Compared with the prior art, the present disclosure has the following advantages.

The superhydrophilic thick-film pH sensor of the present disclosure has a simple structure and a compact volume, and exhibits excellent environmental adaptability to detection of a pH in a heterogeneous system such as a cultivation soil and a cultivation substrate. When the substrate is glass, a production cost can be reduced, the titanium sheet attached to the glass and the insulating layer wrapping the glass can improve the impact resistance of the glass, and a mechanical strength of the glass can meet the needs of conventional tests, such as a test of a pH in a cultivation substrate in a laboratory or a plant factory. When the substrate is an alumina ceramic, the superhydrophilic thick-film pH sensor exhibits excellent mechanical strength and environmental adaptability, and can be used for detection of a pH in a cultivation soil.

Moreover, in the present disclosure, a pH sensor with a superhydrophilic surface is prepared through a reaction between a titanium sheet and a NaOH solution, and the superhydrophilic surface has a network, ribbon-like, or concave-convex microtexture and thus has a very large specific surface area. Compared with the preparation method in which a microtexture is fabricated through magnetron sputtering in the prior art, the preparation method of the present disclosure has a simple process flow and a significantly-reduced cost. Compared with the anodic oxidation method that requires precision instruments to control factors such as a reaction current, an ion concentration in an electrolytic cell, and a temperature in an electrolytic cell, the preparation method of the present disclosure only requires the control of a concentration of a NaOH solution, a reaction time, and a reaction temperature, has low process difficulty, and is conducive to large-scale production, which can further reduce the production and use costs. The preparation method of the sensor of the present disclosure is safe and eco-friendly, involves low energy consumption, and does not produce highly-polluting intermediate products, which is conducive to pollution and energy consumption reduction.

In the drawings, 1: working electrode, 11: titanium sheet, 12: titanium dioxide sensitive layer, 2: substrate, 21: electrically-conductive layer, 3: first wire, 4: second wire, 5: reference electrode, 51: silver layer, 52: silver chloride layer, 53: naphthol layer, and 6: insulating layer.

DETAILED DESCRIPTION OF THE EMBODIMENTS

The embodiments of the present disclosure are described below in detail. Examples of the embodiments are shown in the accompanying drawings. The same or similar numerals represent the same or similar elements or elements having the same or similar functions throughout the specification. The embodiments described below with reference to the accompanying drawings are exemplary, and are intended to explain the present disclosure, but should not be construed as a limitation to the present disclosure.

In the present disclosure, unless otherwise clearly specified and defined, meanings of terms "arrange", "connect with", "connect to", and "fixed to" should be understood in a broad sense. For example, the connection may be a fixed connection, a removable connection, or an integral connection; may be a mechanical connection or an electrical connection; may be a direct connection or an indirect connection via a medium; or may be intercommunication between two components. Those of ordinary skill in the art may understand specific meanings of the above terms in the present disclosure based on specific situations.

Figure 1:
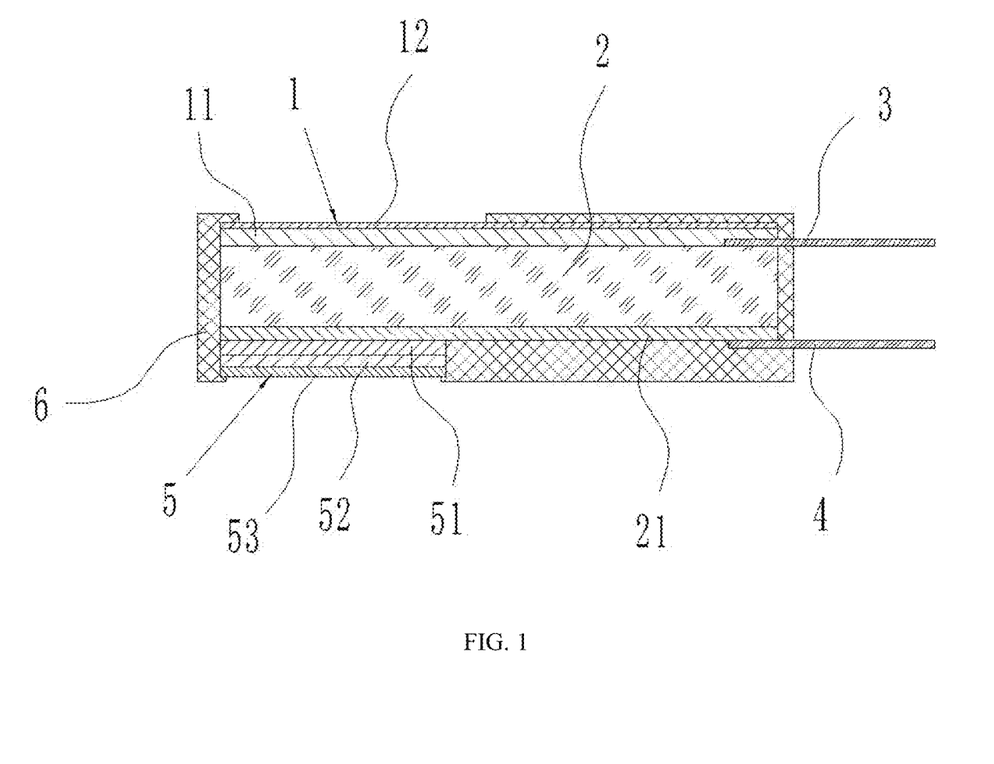
FIG. 1 is a cross-sectional view of a structure of the superhydrophilic thick-film pH sensor based on chemical etching in the present disclosure.

As shown in FIG. 1, an embodiment of the superhydrophilic thick-film pH sensor based on chemical etching in the present disclosure is provided, and the superhydrophilic thick-film pH sensor based on chemical etching includes a substrate 2, and a working electrode 1 and a reference electrode 5 that cover surfaces of the substrate 2, where the working electrode 1 includes a titanium sheet 11 attached to one side of the substrate 2; a front part of an outer surface of the titanium sheet 11 is covered with a titanium dioxide sensitive layer 12, and a tail of the titanium sheet 11 is connected to a first wire 3; an electrically-conductive layer 21 is attached to the other side of the substrate 2; a tail of the electrically-conductive layer 21 is connected to a second wire 4; the reference electrode 5 is located on the electrically-conductive layer 21, and a surface of the reference electrode 5 is coated with a naphthol layer 53; an insulating layer 6 wraps the substrate 2 to expose only the working electrode 1 and the reference electrode 5, such that a part of the titanium dioxide sensitive layer 12 and a part of the naphthol layer 53 are in direct contact with an outside environment; and the first wire 3 and the second wire 4 are led out through the insulating layer.

As shown in FIG. 1, the substrate 2 is a glass sheet, and a material of the electrically-conductive layer 21 is ITO; the reference electrode 5 includes a silver layer 51 connected to the electrically-conductive layer 21; and the silver chloride layer 52 covers the silver layer 51, and the naphthol layer 53 covers the silver chloride layer 52.

Figure 2:
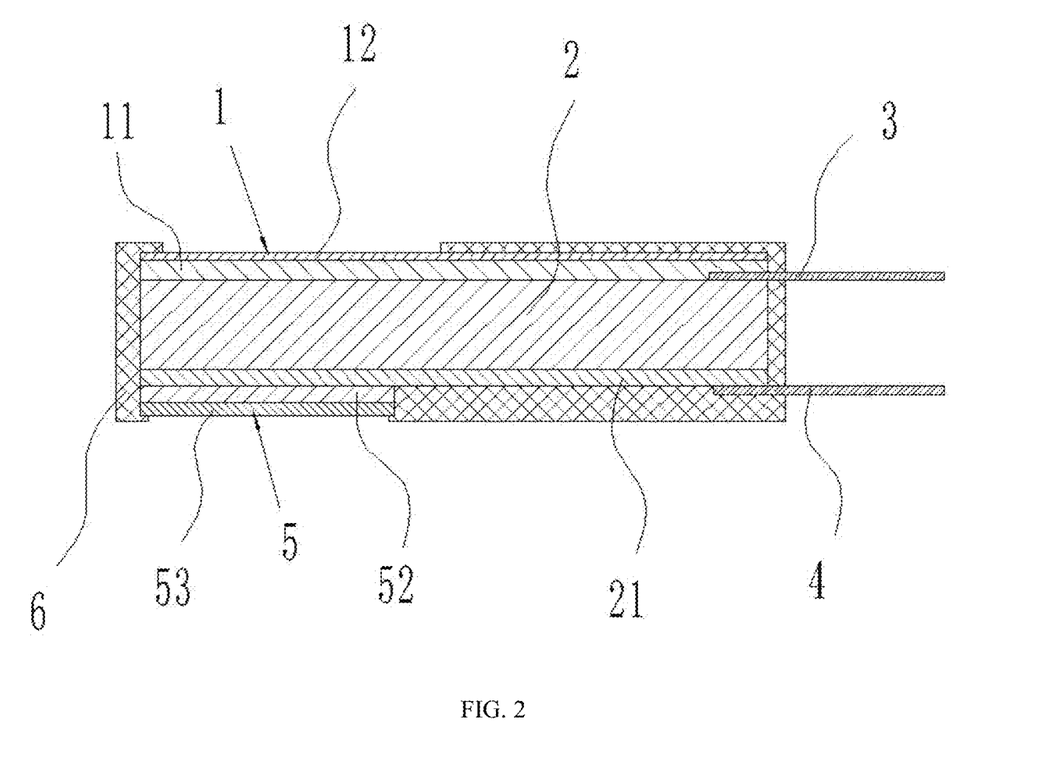
FIG. 2 is a cross-sectional view of another structure of the superhydrophilic thick-film pH sensor based on chemical etching in the present disclosure.

As shown in FIG. 2, the substrate 2 is an alumina ceramic sheet, and a material of the electrically-conductive layer 21 is silver; the reference electrode 5 includes a silver chloride layer 52 covering a front part of the electrically-conductive layer 21; and the naphthol layer 53 covers the silver chloride layer 52.

A preparation method of the superhydrophilic thick-film pH sensor based on chemical etching described above is provided, including the following steps:

A side of the clean titanium sheet 11 is covered with a protective film, the titanium sheet is inserted into a sodium hydroxide solution with a concentration of 0.5 mol/L to 4 mol/L to allow a reaction at 80° C. for 15 min to 180 min, the titanium sheet is taken out, and the protective film is removed from the titanium sheet to obtain the titanium sheet 11 with the titanium dioxide sensitive layer 12 at a single side.

One side of the substrate 2 is covered with the electrically-conductive layer 21, and the reference electrode 5 is fabricated on a front region of the electrically-conductive layer 21.

A 0.5 wt % naphthol solution is dropped on the surface of the reference electrode 5 and then air dried; and the naphthol dropping-air drying process is repeated three times to obtain the naphthol layer 53.

The titanium sheet 11 is bonded to the other side of the substrate 2; the first wire 3 and the second wire 4 are connected to the tails of the titanium sheet 11 and the electrically-conductive layer 21, respectively; the insulating layer 6 is coated on a periphery of the substrate 2 with a part of the titanium dioxide sensitive layer 12 and a part of the naphthol layer 53 exposed to serve as reaction areas of the working electrode 1 and the reference electrode 5, respectively; and the first wire 3 and the second wire 4 are led out through the insulating layer 6.

When the substrate 2 is the glass sheet 22 and a material of the electrically-conductive layer 21 is ITO, during fabrication of the reference electrode 5, the silver layer 51 is deposited in a specified area of the ITO layer, then a 1 wt % sodium hypochlorite solution is dropped on a surface of the silver layer 51, and after turning pale-purple, the silver layer 51 is rinsed with deionized water to obtain the silver chloride layer 52.

When the substrate 2 is the alumina ceramic sheet 23, silver is deposited on a side of the substrate 2 to obtain the electrically-conductive layer 21; and during fabrication of the reference electrode 5, a 1 wt % sodium hypochlorite solution is dropped on a front area of a surface of the electrically-conductive layer 21, and after turning pale-purple, the front area is rinsed with deionized water to obtain the silver chloride layer 52.

Figure 3:
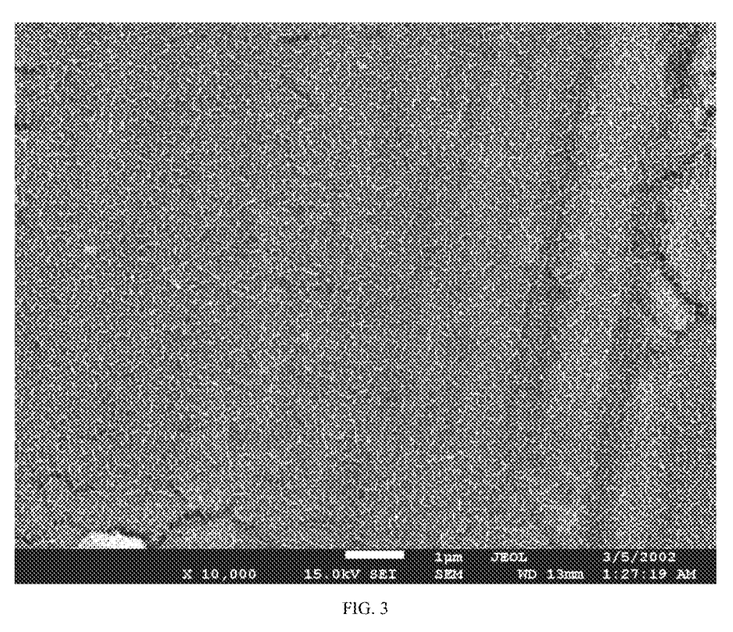
FIG. 3 is a scanning electron microscopy (SEM) image of Example 1 at a magnification of 10,000.
Figure 4:
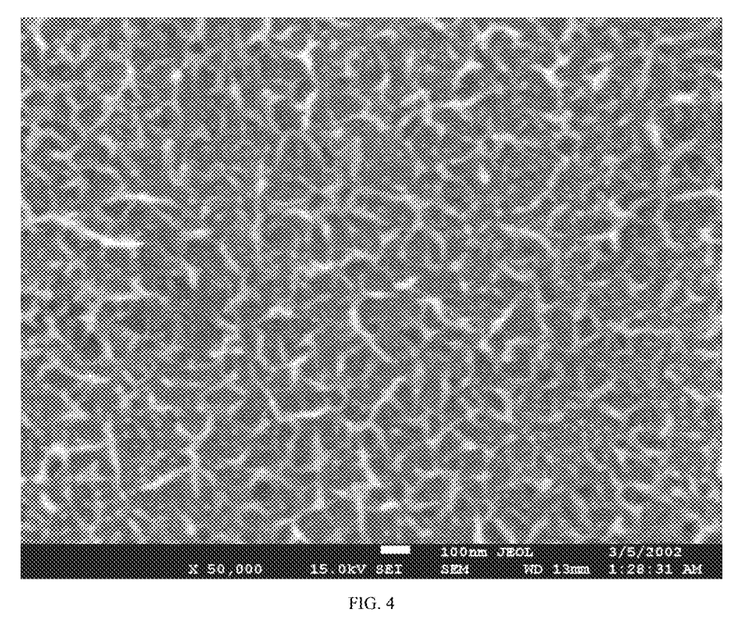
FIG. 4 is an SEM image of Example 1 at a magnification of 50,000.

As shown in FIG. 3 and FIG. 4, Example 1 of preparation parameters and an effect of a working electrode of the superhydrophilic thick-film pH sensor based on chemical etching in the present disclosure: The titanium sheet 11 was placed in a 0.5 mol/L sodium hydroxide solution, and heated to 80° C. in a water bath and kept at this temperature for 15 min to form a titanium dioxide sensitive layer 12 with a fine ribbon-like microtexture; and a sensor prepared correspondingly had a sensitivity of 52.59 mV/pH and an average film thickness of about 130 nm.

Figure 5:
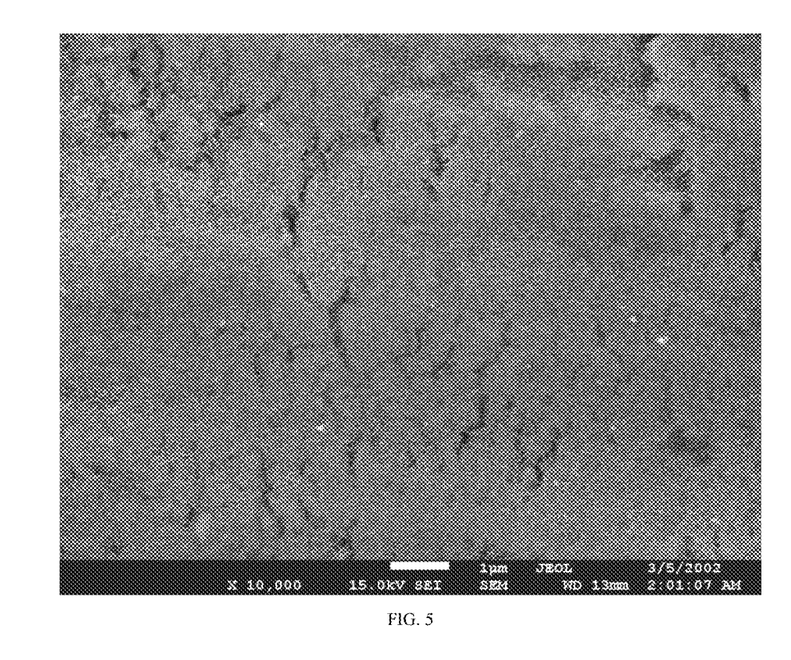
FIG. 5 is an SEM image of Example 2 at a magnification of 10,000.
Figure 6:
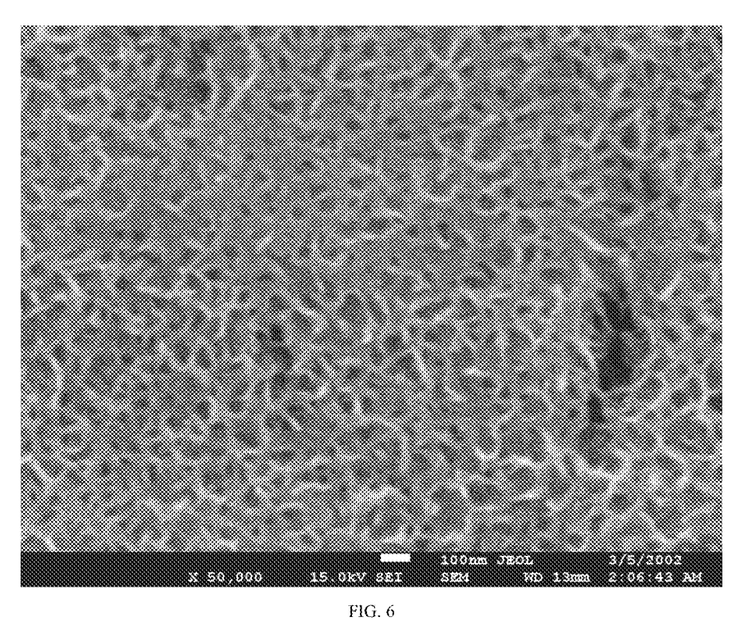
FIG. 6 is an SEM image of Example 2 at a magnification of 50,000.

As shown in FIG. 5 and FIG. 6, Example 2 of preparation parameters and an effect of a working electrode of the superhydrophilic thick-film pH sensor based on chemical etching in the present disclosure: The titanium sheet 11 was placed in a 0.5 mol/L sodium hydroxide solution, and heated to 80° C. in a water bath and kept at this temperature for 180 min to form a titanium dioxide sensitive layer 12 with a relatively-obvious concave-convex microtexture; and a sensor prepared correspondingly had a sensitivity of 50.12 mV/pH and an average film thickness of about 230 nm.

Figure 7:
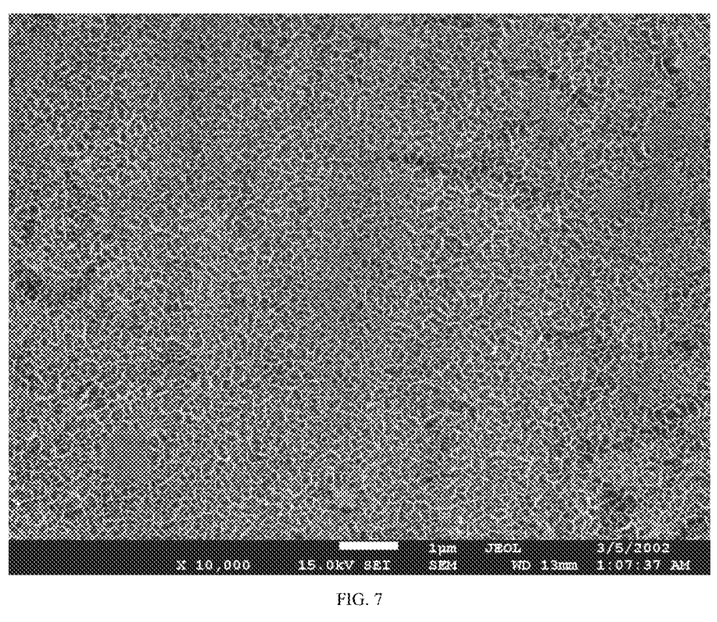
FIG. 7 is an SEM image of Example 3 at a magnification of 10,000.
Figure 8:
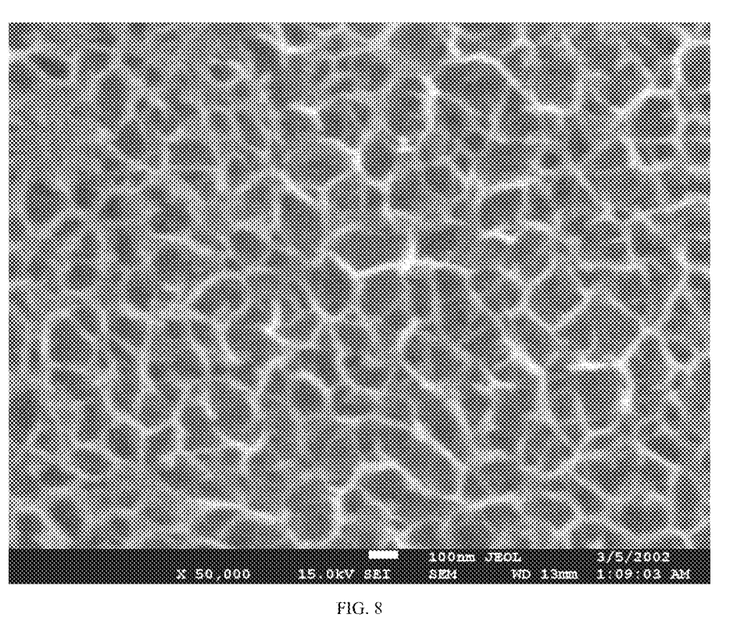
FIG. 8 is an SEM image of Example 3 at a magnification of 50,000.

As shown in FIG. 7 and FIG. 8, Example 3 of preparation parameters and an effect of a working electrode of the superhydrophilic thick-film pH sensor based on chemical etching in the present disclosure: The titanium sheet 11 was placed in a 4 mol/L sodium hydroxide solution, and heated to 80° C. in a water bath and kept at this temperature for 15 min to form a titanium dioxide sensitive layer 12 with a relatively-obvious ribbon-like microtexture; and a sensor prepared correspondingly had a sensitivity of 52.43 mV/pH and an average film thickness of about 130 nm.

Figure 9:
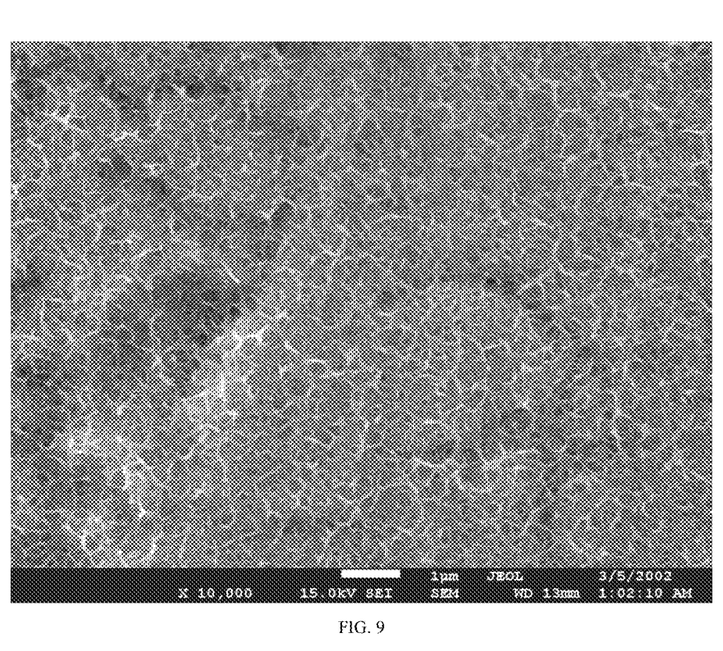
FIG. 9 is an SEM image of Example 4 at a magnification of 10,000.
Figure 10:
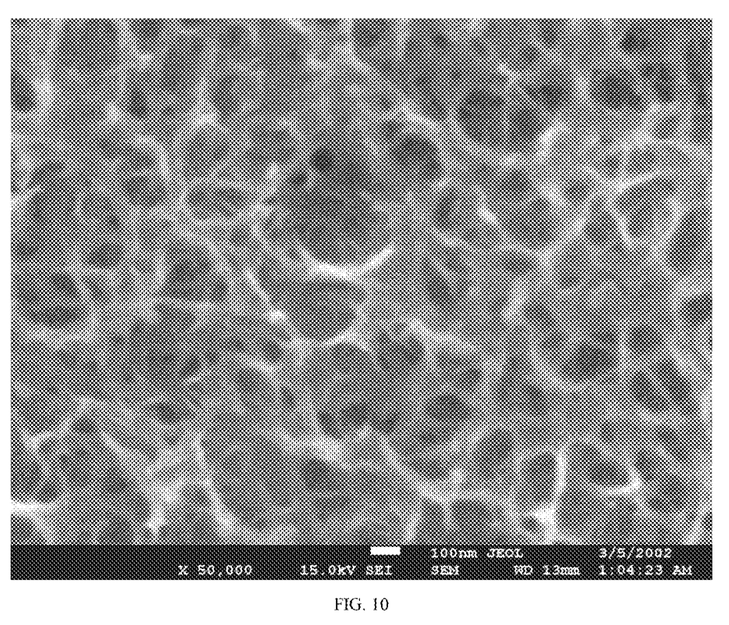
FIG. 10 is an SEM image of Example 4 at a magnification of 50,000.

As shown in FIG. 9 and FIG. 10, Example 4 of preparation parameters and an effect of a working electrode of the superhydrophilic thick-film pH sensor based on chemical etching in the present disclosure: The titanium sheet 11 was placed in a 4 mol/L sodium hydroxide solution, and heated to 80° C. in a water bath and kept at this temperature for 180 min to form a titanium dioxide sensitive layer 12 with a multi-layered network structure and a hill-like stacked microtexture; and a sensor prepared correspondingly had the lowest sensitivity of 47.26 mV/pH among experimental groups.

Figure 11:
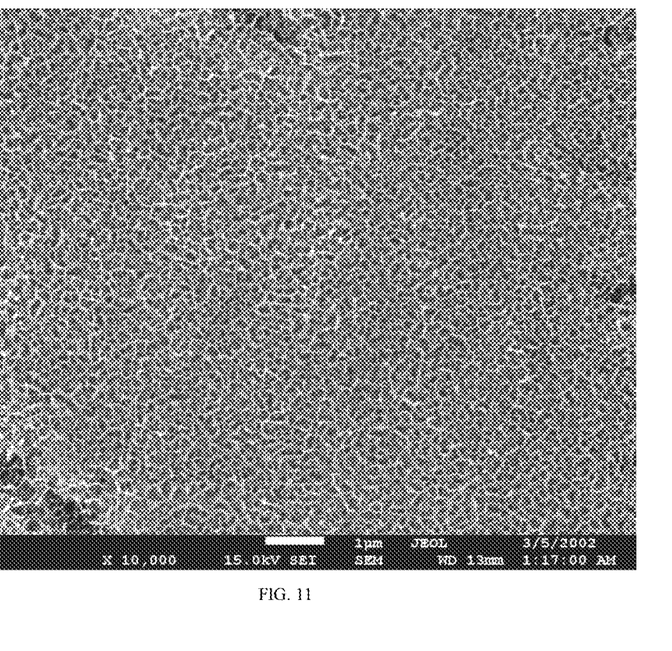
FIG. 11 is an SEM image of Example 5 at a magnification of 10,000.
Figure 12:
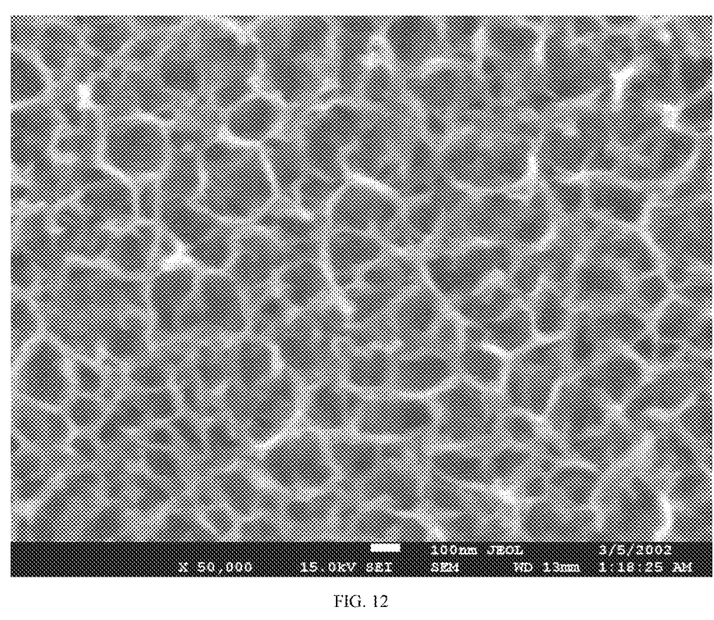
FIG. 12 is an SEM image of Example 5 at a magnification of 50,000.
Figure 13:
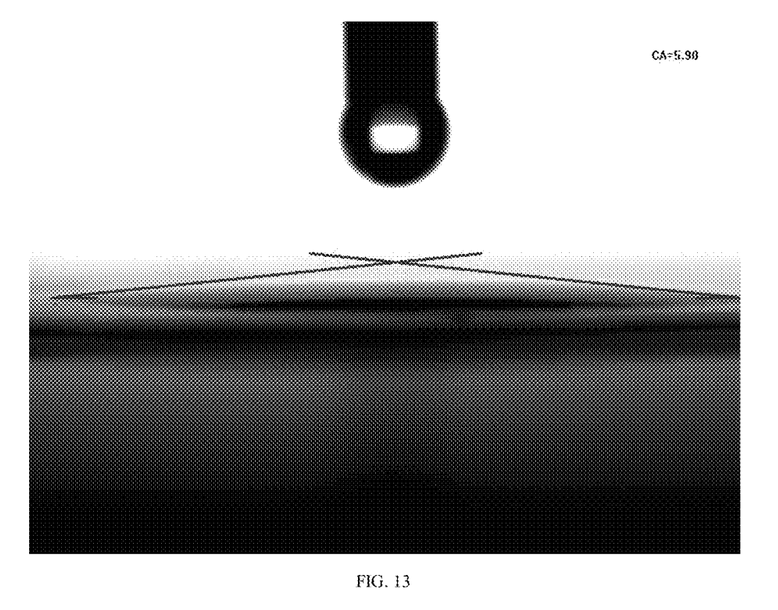
FIG. 13 is a contact angle-measuring image of Example 5.

As shown in FIG. 11 and FIG. 12, Example 5 of preparation parameters and an effect of a working electrode of the superhydrophilic thick-film pH sensor based on chemical etching in the present disclosure: The titanium sheet 11 was placed in a 1 mol/L sodium hydroxide solution, and heated to 80° C. in a water bath and kept at this temperature for 30 min to form a titanium dioxide sensitive layer 12 with a distinct and uniform network microtexture; and a sensor prepared correspondingly had the highest sensitivity of 54.30 mV/pH among experimental groups, an average film thickness of about 200 nm, and a contact angle of 5.9°, as shown in FIG. 13.

In the present disclosure, the working electrode 1 is obtained by soaking the titanium sheet 11 in an 80° C. NaOH solution, and is integrated with the reference electrode 5 fabricated on the substrate 2 to produce the thick-film pH sensor. The superhydrophilic thick-film pH sensor of the present disclosure has a simple structure, high detection sensitivity, and excellent stability, and can quickly and accurately determine a pH in a heterogeneous system. The preparation method of the superhydrophilic thick-film pH sensor is simple and easy to control, has a low production cost, and is safe and eco-friendly because no toxic substances are generated during production. The superhydrophilic thick-film pH sensor is suitable for on-line detection of a pH of a cultivation soil, a cultivation substrate, or the like in agricultural production.

The series of detailed description listed above are only specific illustration of feasible embodiments of the present disclosure, and are not intended to limit the claimed scope of the present disclosure. All equivalent embodiments or changes made without departing from the technical spirit of the present disclosure should be included in the claimed scope of the present disclosure.

What is claimed is:

1. A preparation method of a superhydrophilic thick-film pH sensor based on chemical etching, wherein the superhydrophilic thick-film pH sensor based on chemical etching comprises a substrate, a working electrode, and a reference electrode, wherein the working electrode comprises a titanium sheet attached to one side of the substrate; a front part of an outer surface of the titanium sheet is covered with a titanium dioxide sensitive layer, and a tail of the titanium sheet is connected to a first wire; an electrically-conductive layer is attached to an other side of the substrate; a tail of the electrically-conductive layer is connected to a second wire; the reference electrode is located on the electrically-conductive layer, and a surface of the reference electrode is coated with a naphthol layer; an insulating layer wraps the substrate to expose only the working electrode and the reference electrode, such that a part of the titanium dioxide sensitive layer and a part of the naphthol layer are in direct contact with an outside environment; and the first wire and the second wire are led out through the insulating layer;

the superhydrophilic thick-film pH sensor based on chemical etching is prepared according to the following steps:

inserting the titanium sheet into a sodium hydroxide solution to allow a reaction to produce the titanium sheet with the titanium dioxide sensitive layer at a single side, specifically comprising: covering a side of the clean titanium sheet with a protective film, inserting the titanium sheet into the sodium hydroxide solution to allow the reaction at 80° C. for a period of time, taking the titanium sheet out, and removing the protective film from the titanium sheet to obtain the titanium sheet with the titanium dioxide sensitive layer at the single side, wherein the sodium hydroxide solution has a concentration of 0.5 mol/L to 4 mol/L, and the reaction is performed for 15 min to 180 min;

covering the other side of the substrate with the electrically-conductive layer, and fabricating the reference electrode on a front region of the electrically-conductive layer;

dropping naphthol on the surface of the reference electrode and air drying as a cycle; and repeating the cycle three times to obtain the naphthol layer; and bonding the titanium sheet to the one side of the substrate; connecting the first wire and the second wire to the tail of the titanium sheet and the tail of the electrically-conductive layer, respectively; coating the insulating layer on a periphery of the substrate to expose only the working electrode and the reference electrode, such that the part of the titanium dioxide sensitive layer and the part of the naphthol layer are in direct contact with the outside environment; and leading the first wire and the second wire out through the insulating layer, wherein the superhydrophilic thick-film pH sensor based on chemical etching has a film thickness of 130 nm to 230 nm.

2. The preparation method of the superhydrophilic thick-film pH sensor based on chemical etching according to claim 1, wherein the substrate is a glass sheet; the electrically-conductive layer is an indium tin oxide layer; and a silver layer is deposited in a specified area of the indium tin oxide layer, then a 1 wt % sodium hypochlorite solution is dropped on a surface of the silver layer, and after turning pale-purple, the silver layer is rinsed with deionized water to obtain a silver chloride layer.

3. The preparation method of the superhydrophilic thick-film pH sensor based on chemical etching according to claim 1, wherein the substrate is an alumina ceramic sheet; and silver is deposited on a side of the substrate to obtain the electrically-conductive layer, a 1 wt % sodium hypochlorite solution is dropped on a front area of a surface of the electrically-conductive layer, and after turning pale-purple, the front area is rinsed with deionized water to obtain a silver chloride layer.

4. A superhydrophilic thick-film pH sensor based on chemical etching, prepared by the preparation method of the superhydrophilic thick-film pH sensor based on chemical etching according to claim 1.

5. The superhydrophilic thick-film pH sensor based on chemical etching according to claim 4, wherein in the preparation method of the superhydrophilic thick-film pH sensor based on chemical etching, the substrate is a glass sheet, and a material of the electrically-conductive layer is indium tin oxide; the reference electrode comprises a silver layer, a silver chloride layer, and the naphthol layer; and the silver layer is arranged on the electrically-conductive layer, the silver chloride layer covers the silver layer, and the naphthol layer covers the silver chloride layer.

6. The superhydrophilic thick-film pH sensor based on chemical etching according to claim 4, wherein in the preparation method of the superhydrophilic thick-film pH sensor based on chemical etching, the substrate is an alumina ceramic sheet, and a material of the electrically-conductive layer is silver; the reference electrode comprises a silver chloride layer and the naphthol layer; and the silver chloride layer covers a front part of the electrically-conductive layer, and the naphthol layer covers the silver chloride layer.

7. The superhydrophilic thick-film pH sensor based on chemical etching according to claim 4, wherein in the preparation method of the superhydrophilic thick-film pH sensor based on chemical etching, the substrate is a glass sheet; the electrically-conductive layer is an indium tin oxide layer; and a silver layer is deposited in a specified area of the indium tin oxide layer, then a 1 wt % sodium hypochlorite solution is dropped on a surface of the silver layer, and after turning pale-purple, the silver layer is rinsed with deionized water to obtain a silver chloride layer.

8. The superhydrophilic thick-film pH sensor based on chemical etching according to claim 4, wherein in the preparation method of the superhydrophilic thick-film pH sensor based on chemical etching, the substrate is an alumina ceramic sheet; and silver is deposited on a side of the substrate to obtain the electrically-conductive layer, a 1 wt % sodium hypochlorite solution is dropped on a front area of a surface of the electrically-conductive layer, and after turning pale-purple, the front area is rinsed with deionized water to obtain a silver chloride layer.

* * * * *